(12) United States Patent
Hodzic et al.

(10) Patent No.: US 7,057,312 B2
(45) Date of Patent: Jun. 6, 2006

(54) LINEAR MOTOR, AND SECONDARY FOR A LINEAR MOTOR

(75) Inventors: Tarik Hodzic, München (DE); Gerhard Matscheko, Starnberg (DE)

(73) Assignee: Siemens Aktiengesellschaft, München (DE)

( * ) Notice: Subject to any disclaimer, the term of this patent is extended or adjusted under 35 U.S.C. 154(b) by 5 days.

(21) Appl. No.: 10/829,658

(22) Filed: Apr. 22, 2004

(65) Prior Publication Data
US 2004/0245860 A1 Dec. 9, 2004

(30) Foreign Application Priority Data
Apr. 22, 2003 (DE) ............... 103 18 207

(51) Int. Cl.
*H02K 41/02* (2006.01)
(52) U.S. Cl. .............. 310/12; 310/13; 310/15
(58) Field of Classification Search .......... 310/12, 310/13, 15
See application file for complete search history.

(56) References Cited

U.S. PATENT DOCUMENTS

| | | | | |
|---|---|---|---|---|
| 4,278,851 A | * | 7/1981 | Takaya | 340/384.6 |
| 4,514,065 A | * | 4/1985 | Carrera | 396/468 |
| 6,029,336 A | * | 2/2000 | Kliman et al. | 29/598 |
| 6,191,510 B1 | * | 2/2001 | Landin et al. | 310/51 |
| 6,566,771 B1 | * | 5/2003 | Stoiber | 310/12 |

FOREIGN PATENT DOCUMENTS

| | | |
|---|---|---|
| DE | 41 10 738 A1 | 10/1992 |
| DE | 195 01 938 A1 | 8/1996 |
| WO | WO 00/30240 | 5/2000 |

* cited by examiner

*Primary Examiner*—Darren Schuberg
*Assistant Examiner*—Iraj A. Mohandesi
(74) *Attorney, Agent, or Firm*—Henry M. Feiereisen

(57) ABSTRACT

A secondary for a linear motor includes a body comprised of at least one secondary member for defining a guideway for a rotor of the linear motor and a cover including magnetizable material for the guideway. Disposed between the secondary member and the cover is an anti-skid layer to secure the cover against displacement.

30 Claims, 6 Drawing Sheets

LINEAR MOTOR, AND SECONDARY FOR A LINEAR MOTOR

CROSS-REFERENCES TO RELATED APPLICATIONS

This application claims the priority of German Patent Application, Serial No. 103 18 207.1, filed Apr. 22, 2003, pursuant to 35 U.S.C. 119(a)–(d), the disclosure of which is incorporated herein by reference.

BACKGROUND OF THE INVENTION

The present invention relates to the field of linear motors, and in particular to linear motors having a primary and a covered secondary.

In general, a linear motor includes a, normally fixed, secondary or reactive part, having in case of a synchronous linear motor a plurality of magnetic elements (permanent magnets) arranged side-by-side to define a guideway for a rotor which is movable relative thereto and represents the primary part of the linear motor. The rotor interacts with the magnets of the secondary and converts this interaction into a translatory motion.

Such linear motors are used as drives in various technological fields, for example, in machine tools, machining devices such as automatic drills, automatic milling cutters, automatic lathes, automatic placement machines or automatic bonding machines, including vehicle drives in magnetic levitation trains, etc.

The structural length of the guideway depends on the intended use of the linear motor and should be at least as long as the required displacement path plus the length of the rotor. In order to have flexibility in connection with the design of linear motors of different length, the secondary is made up of single short secondary members, which are arranged side-by-side until reaching the desired length.

The hereby created butt-joints are, however, disadvantageous in particular when exposed to rough whether, because dust, operating liquid, aggressive materials etc. can accumulate there. It also happens frequently that solid structures, tool pieces etc. migrate onto the guideway, for example, when drill bits break off from automatic drills. In the most adverse case, these solid materials may be snatched by the rotor and forced in the area of the butt-joints into the secondary.

To avoid this, the guideway is, typically, provided with a cover which is normally designed as a plastic film glued onto the guideway of the secondary member. Oftentimes, however, the butt-joints cannot be neutralized adequately, thereby causing unevenness, and thus are subjected to the afore-mentioned mechanical stress; However, also other regions can be damaged fairly easily. Thus, the plastic films must be replaced from time to time. As they are glued onto the guideways of the secondary member, replacement is relatively time-consuming and cost-intensive and causes shutdown periods of the machine.

German Pat. No. DE 195 01 938 A1 describes a moving secondary (or rotor) for a linear motor in which the magnetic elements are enclosed by a cover of, preferably, magnetic material. However, as the rotor of the linear motor is concerned here, the afore-stated problems as relating to long stators are not relevant here. Furthermore, the cover is connected with fasteners, namely screws, for the entire length of the armature so that a simple exchange is not possible.

International publication no. WO 00/30240 describes a linear motor having a secondary composed of plural secondary members, wherein the guideway of the secondary is protected by a cover. The cover contains magnetizable material for adherence to the secondary members. In particular when dirt or foreign matters such as chips are encountered between the primary (or rotor) and the secondary, jamming may be experienced so as to expose the cover to a force. The magnetic cover can thus shift during operation of the linear motor or even detach from the secondary as the static friction between cover and secondary is not sufficient.

It would therefore be desirable and advantageous to provide an improved secondary for a linear motor and an improved linear motor to obviate prior art shortcomings and to enhance the attachment of a cover to the secondary.

SUMMARY OF THE INVENTION

According to one aspect of the present invention, a secondary for a linear motor includes a body comprised of at least one secondary member for defining a guideway for a rotor of the linear motor, a cover including magnetizable material and provided for the guideway, and an anti-skid layer disposed between the secondary member and the cover.

The present invention resolves prior art problems by providing an anti-skid layer for increasing the friction between the secondary and the cover. In this way, the initial breakaway torque, required to displace the cover, can be increased in a simple manner. The cover rests on a surface of the secondary member and adheres thereto because, for example, the magnetizable material of the cover is attracted by the permanent magnets of the secondary.

Suitably, the anti-skid layer adheres permanently to the cover so that the cover together with the anti-skid layer can be removed if replacement is desired. The anti-skid layer thus constitutes a coating of the cover, with the anti-skid effect realized by the application upon the secondary member. The slip resistance increases with increase of the application force. As an alternative, the anti-skid layer may adhere to the secondary member in such a manner that the cover can be removed without detachment of the anti-skid layer from the secondary member. This variation is advantageous when the anti-skid layer has a long service life so that there is no need to remove the anti-skid layer when the cover needs to be replaced. Costs are thus also reduced for the cover because it can be made without the anti-skid layer.

Of course, an anti-skid layer may be applied on both sides, i.e. upon the cover as well as upon the secondary member so that, in fact, two anti-skid layers may be disposed upon one another, or also next to one another. The anti-skid layer increases the static friction of the cover upon the secondary. The slip resistance can, for example, be realized by providing the anti-skid layer with silicone, or making the anti-skid layer of silicone. As the layer adheres to the cover as well as to the secondary member, the cover can be easily attached or detached. This is advantageous, when replacement becomes necessary. Suitably, the cover coated with the anti-skid layer may be pre-fabricated so that the need for an extra working step to coat the cover is eliminated, when the secondary is installed on site in the linear motor. Suitably, the anti-skid layer has a thickness of up to 0.2 mm.

According to another feature of the present invention, the anti-skid layer may be constructed as separate inset between the cover and the secondary member, and is thus neither attached upon the cover nor upon the secondary member.

According to another feature of the present invention, the anti-skid layer may be comprised of at least two different materials, such as, for example, silicone and rubber. In this way, different material properties can be combined.

According to another feature of the present invention, the anti-skid layer may include a surface structure. As a result, the adherence of the cover can be improved. For example, the surface structure may be so configured as to provide channels for drainage of liquid, such as oil. This effect is desired because oil provides an unwanted sliding action.

According to another feature of the present invention, the surface structure may have a serrated configuration, e.g. including a toothed surface between the anti-skid layer upon the cover and the confronting surface of the secondary. The serrated surface structure with intermeshing teeth can also be implemented when the secondary member is coated or even when the secondary member and the cover are coated. The surface structure may be made, for example, by an embossing process of the anti-skid layer, e.g. silicone layer.

According to another feature of the present invention, fasteners are provided at the ends of the secondary for securing to a support base the part of the cover that extends beyond the ends of the secondary. On the one hand, the ends of the secondary form exposed attack surfaces so that an added securement is desired, and, on the other hand, the ends of the secondary can be made of non-magnetizable material. In the event, the secondary is comprised of a plurality of secondary members, the provision of fasteners between the joints of neighboring secondary members should be avoided because the area of the cover between the ends of the secondary and in particular in the zone of the air gap between the primary and the secondary should be held in place solely by the magnetic force. The cover may hereby be made in one piece of magnetizable material or of non-magnetic material having sections of magnetic material, such as strips extending along the guideway and contacting the surface of the secondary, with strips of anti-skid layer being disposed between the strips of magnetic material of the cover and the confronting surface of the secondary.

As losses due to magnetic material in the air gap are proportional to the layer thickness, on the one hand, and proportional to the load-carrying capability, on the other hand, the magnetizable material should have a saturation induction of no more than 1.5 Tesla at a currently preferred layer thickness of less than 0.5 mm. To ensure a sufficient adhesive force, the minimum saturation induction should be 0.3 Tesla, and to ensure a sufficient function of the cover as protection against mechanical stress, a minimum layer thickness of 0.1 mm should be provided. A suitable material is, for example, special steel with a saturation magnetization of ¾ 1.5 Tesla.

Covers in the range of the afore-mentioned parameter adhere sufficiently firm to the secondary, afford protection against mechanical damage and can be applied in one piece over the entire length of the guideway and, for example, delivered as roll material.

As the material is sufficiently firm against mechanical stress and can be designed as a single-piece web for stable positioning on the secondary, the provision of a length scale onto the material, for example, by engraving, imprinting, bonding etc. is possible. Such length scales, which are used for operation of a linear motor for position control, have been attached heretofore laterally on the secondary and read by a reading head on the rotor. This lateral attachment has, however, the effect that a possible horizontal tilting of the rotor with respect to the secondary may cause a measuring error in longitudinal direction of the scale. By providing the scale on the cover of the secondary, preferably in the center of the guideway, a tilting of the rotor leads only to a lateral shift of the reading head upon the scale but not to a shift in the longitudinal direction, so that the configuration according to the invention leads to a more accurate measurement of the position.

According to another aspect of the present invention, a linear motor includes a rotor, and a secondary having a body comprised of at least one secondary member for defining a guideway for the rotor, a cover including magnetizable material for the guideway, and an anti-skid layer disposed between the secondary member and the cover.

According to still another aspect of the present invention, a cover for a secondary or primary of a linear motor includes a cover body; and an anti-skid layer applied to the cover body. Suitably, the cover body includes magnetizable material.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
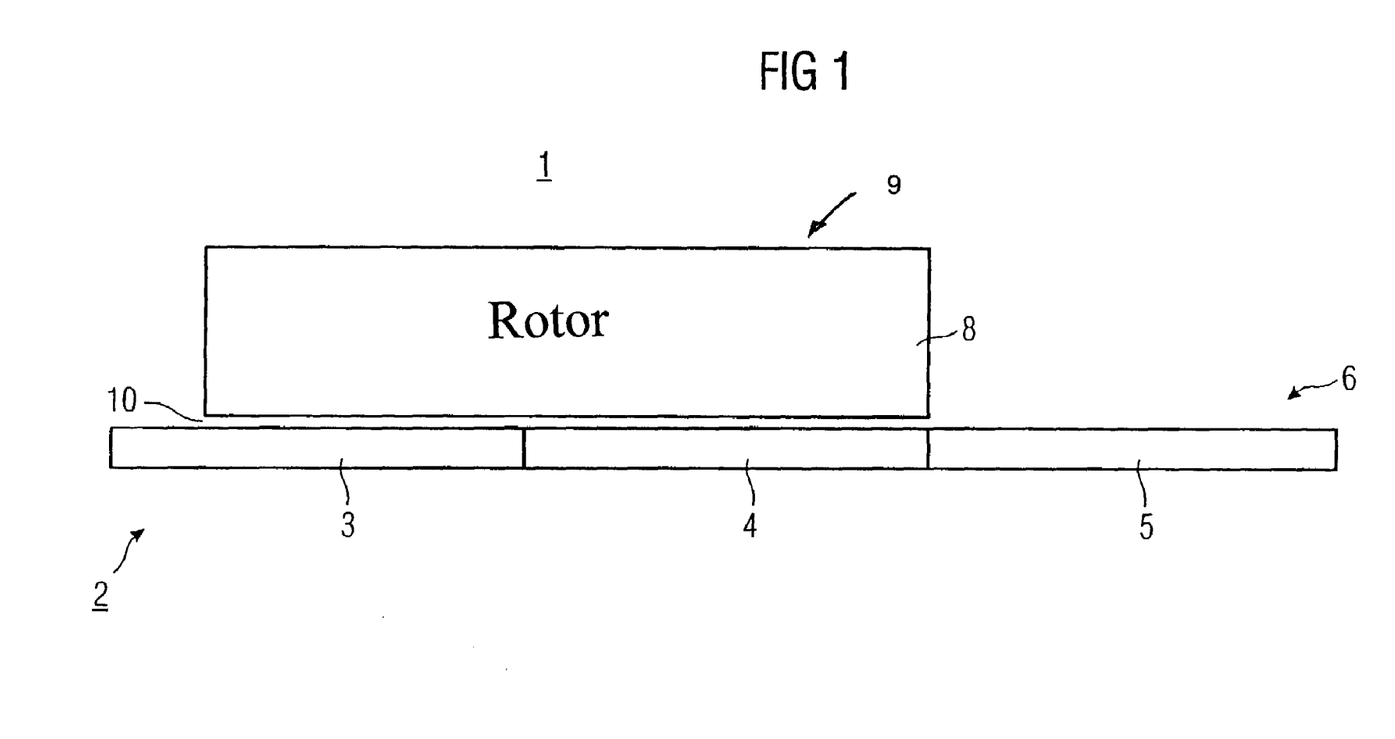
FIG. 1 is a simplified schematic illustration of a linear motor, embodying the subject matter of the present invention.

Turning now to the drawing, and in particular to FIG. 1, there is shown a simplified schematic illustration of a linear motor 1 having a primary, generally designated by reference numeral 9 and representing a rotor 8, and a secondary, generally designated by reference numeral 2. The rotor 8 and the secondary 2 are disposed at a distance to one another to define an air gap 10 therebetween. In the non-limiting example of FIG. 1, the secondary 2 includes a plurality of secondary members 3, 4, 5 arranged side-by-side to define a guideway 6 of desired length along which the rotor 8 moves. It is to be understood by persons skilled in the art that the term "rotor" is used here in a generic sense and generally refers to the moving part of the linear motor in relation to the secondary 2.

Figure 2:
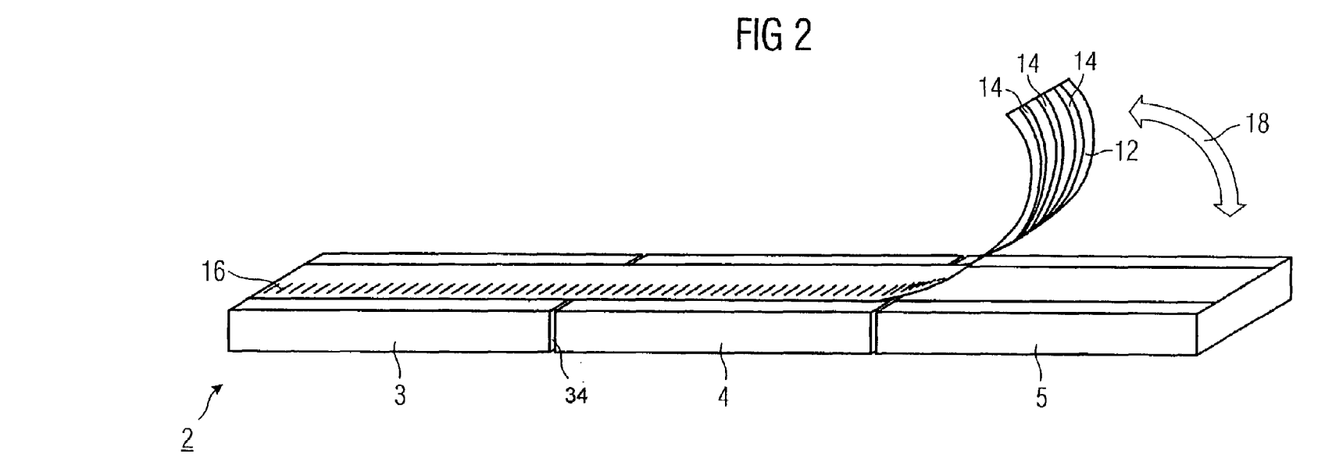
FIG. 2 is a perspective view of a secondary of the linear motor with partially detached cover.

As shown in FIG. 2, the secondary 2 has a cover 12 which has a secondary-distal side and a secondary-proximal side, whereby the secondary-proximal side is provided with an anti-skid layer 14 of strip-like configuration. In FIG. 2, the cover 12 is shown partly detached to illustrate the provision of several strips 14 (here three, by way of example) of anti-skid material. A scale 16 is provided on the secondary-distal side of the cover 12 which can be can be registered by a respective reading head (not shown) on the rotor 8. The scale 16 is preferably disposed in the center of the cover 12.

Figure 3:
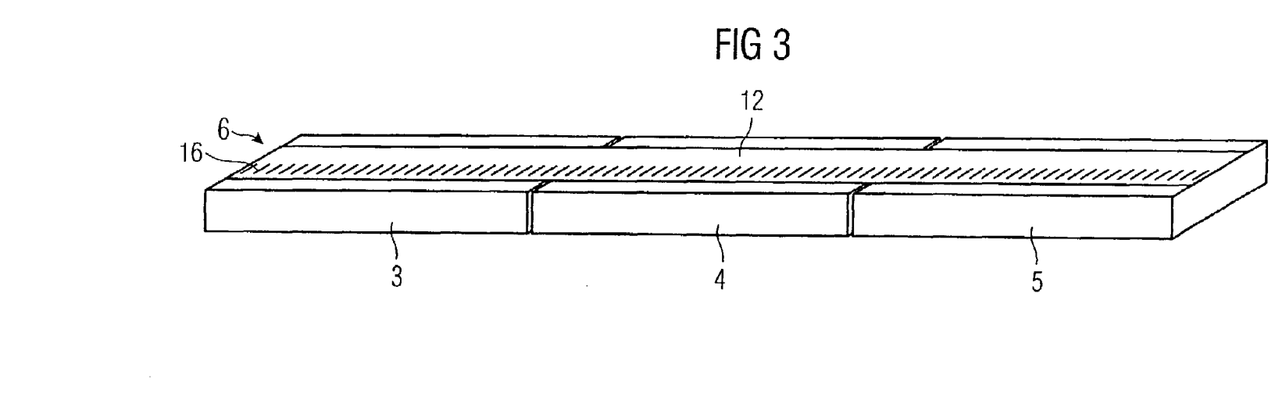
FIG. 3 is a perspective view of the secondary of the linear motor with fully attached cover.

The cover 12 extends along of the secondary members 3, 4, 5, with double arrow 18 indicating attachment and detachment of the cover 12 upon the secondary 2.

Figure 4:
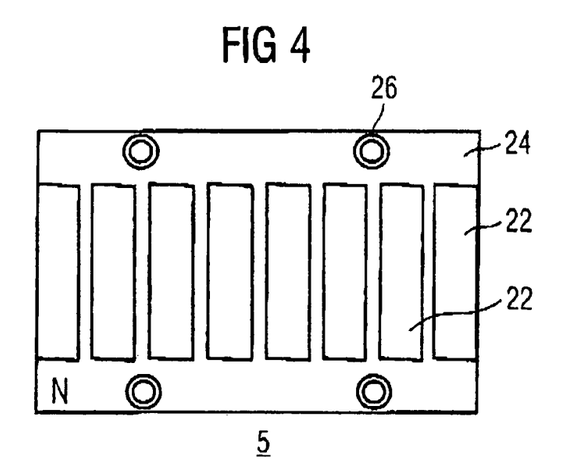
FIG. 4 is a plan view of the secondary with the cover being removed.
Figure 5:
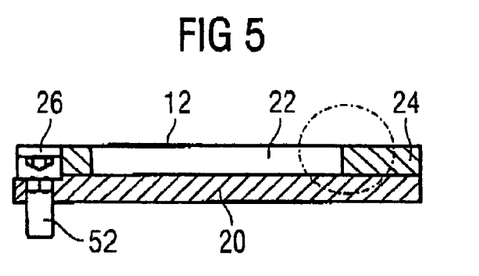
FIG. 5 is a cross sectional view of the secondary of FIG. 4.

FIGS. 4 and 5 show a basic configuration of a secondary member, here the secondary member 5. A row of magnetic elements 22 is arranged in spaced-apart disposition on a base plate 20. Synthetic resin as casting material 24 is cast around the magnetic elements 22 for enclosing the magnetic elements 22 on all sides, with the exception of the base plate 20, to thereby form a compact construction of the secondary member 5 which can be mounted at a proper position via boreholes 26 and bolts 52.

Figure 5A:
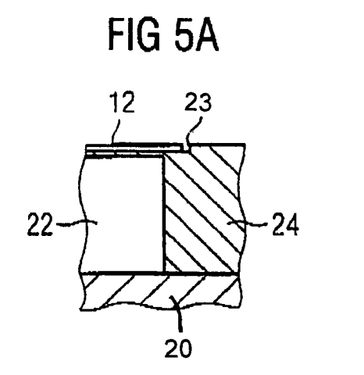
FIG. 5a is an enlarged detailed view of the area encircled in FIG. 5.

The casting material 24 is formed, e.g., with a recess 23 for receiving the cover 12, as shown in particular in FIG. 5a. The recess may be formed during casting operation of the magnetic elements 22, or by a separate milling operation, whereby the depth of the recess should substantially correspond to the thickness of the cover 12, e.g. a metal sheet, in order to realize a substantially even surface of the secondary 2.

Figure 6:
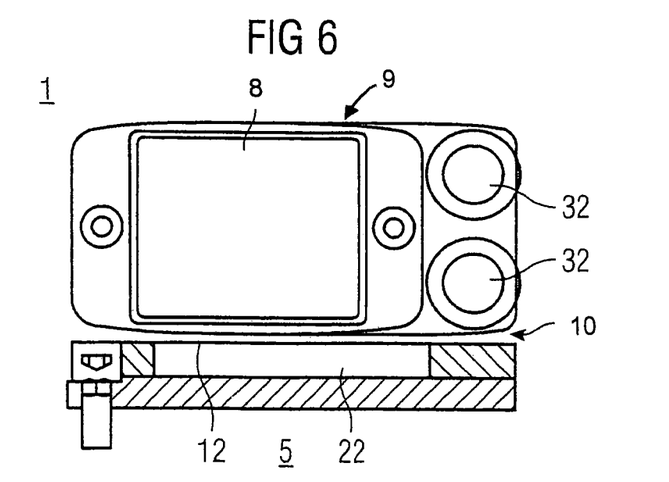
FIG. 6 is a frontal view of the linear motor with the secondary shown by way of a cross section with attached cover.
Figure 7:
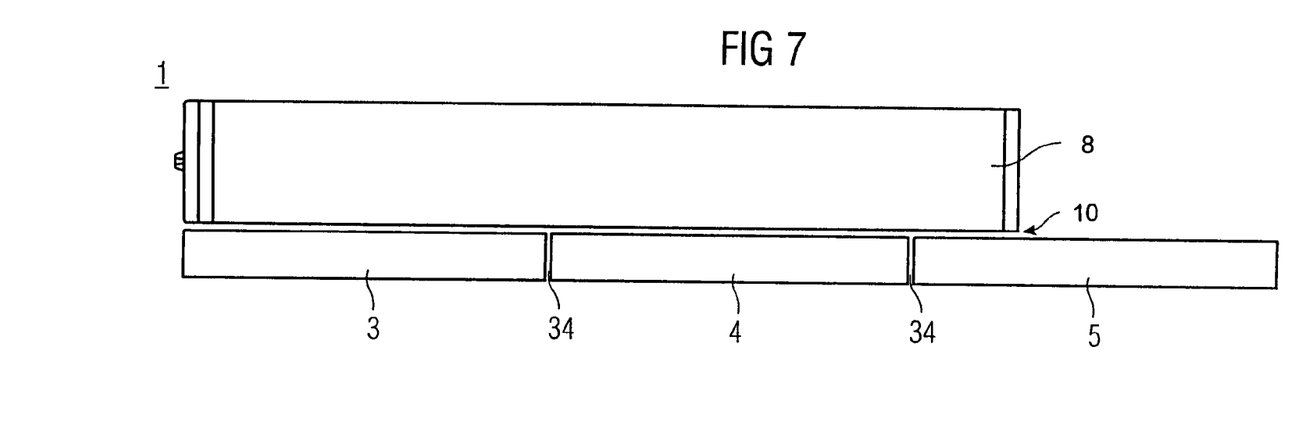
FIG. 7 is a more detailed, simplified and schematic illustration of the linear motor.

FIG. 6 shows a frontal view of the linear motor 1, with the rotor 8 interacting with the secondary member 5 via the air gap 10. Structure of the rotor 8 with connections 32 etc. is generally known and not explained in more detail. FIG. 7 shows a side view of the linear motor 1 and depicts the side-by-side disposition of the secondary members 3, 4, 5 to realize a desired length of the secondary 2, with butt joints 34 formed between adjoining secondary members 3, 4, 5.

While it is generally possible to provide each individual secondary member 3, 4, 5 with a separate cover 12, the butt joints 34 between adjacent secondary member 3, 4, 5 would then extend to the surface of the guideway 6. Therefore, it is preferred to use a continuous web material for the cover 12, which can be shipped, for example, as roll material and attached continuously from one end of the guideway to the other end. The web material may hereby carry a scale 16, which can be registered by a respective reading head on the rotor 8.

The cover 12 is held in place by all magnetic elements 22 of the secondary 2 and thus reliably protected against displacement in horizontal direction. For removal, the cover 12 can be simply lifted off by overcoming the action of the respective magnetic elements 22.

Figure 8:
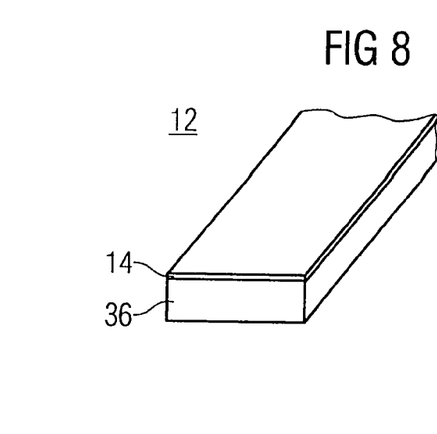
FIG. 8 is a fragmentary perspective illustration of a first variation of the cover in accordance with the present invention.
Figure 9:
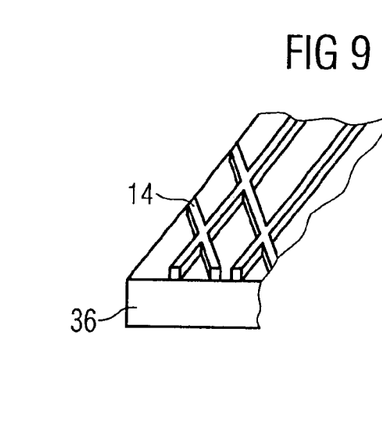
FIG. 9 is a fragmentary perspective illustration of a second variation of the cover in accordance with the present invention.
Figure 10:
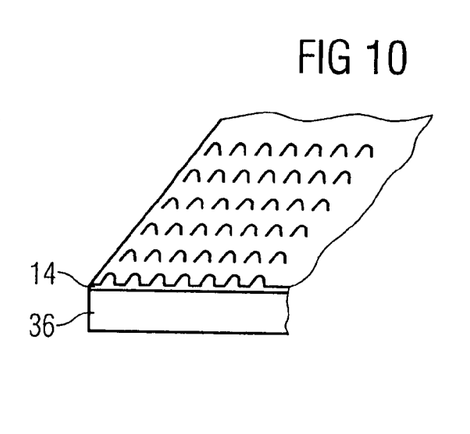
FIG. 10 is a fragmentary perspective illustration of a third variation of the cover in accordance with the present invention.
Figure 11:
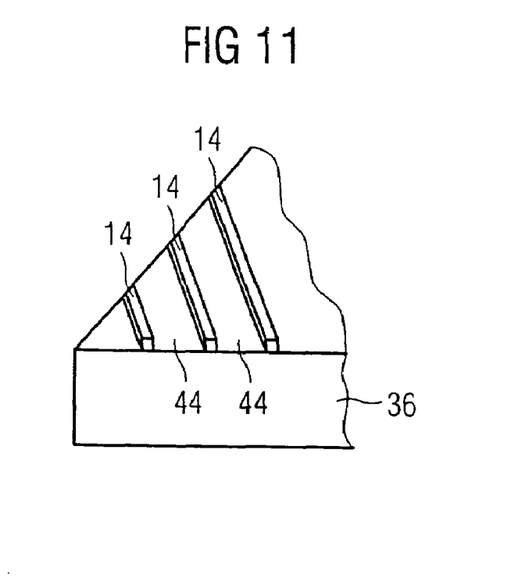
FIG. 11 is a fragmentary perspective illustration of a fourth variation of the cover in accordance with the present invention.

Referring now to FIG. 8, there is shown a fragmentary perspective illustration of a first variation of the cover 12 in accordance with the present invention. The cover 12 includes a carrier 36, e.g. a metal sheet, on which the anti-skid layer 14 is applied, and has a configuration which extends continuously over the entire secondary-proximal surface of the carrier 35. FIG. 9 shows another variation of the cover 12, whereby the anti-skid layer 14 has a mesh-like configuration. FIG. 10 shows yet another variation of the cover 12, whereby the anti-skid layer 14 has a nap-like configuration. FIG. 11 shows still another variation of the cover 12, whereby the anti-skid layer 14 is applied in the form of parallel strips to define channels 44 for drainage of liquid, such as oil, that counteracts the anti-skid effect.

Figure 12:
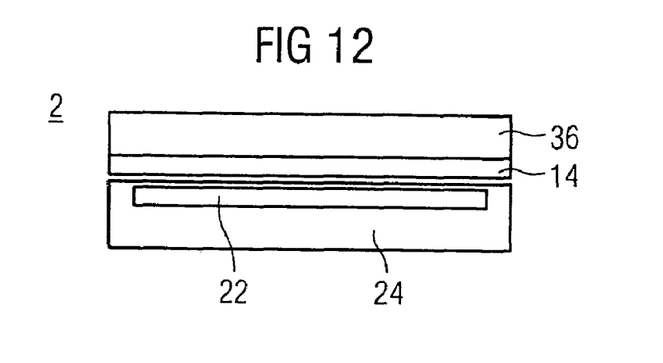
FIG. 12 is a schematic illustration of a first variation of a secondary in accordance with the present invention.
Figure 13:
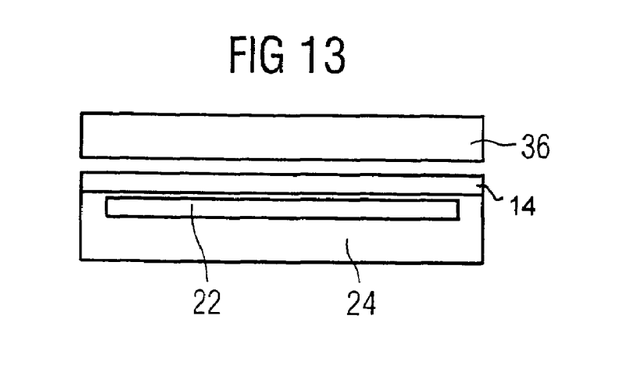
FIG. 13 is a schematic illustration of a second variation of a secondary in accordance with the present invention.

Turning now to FIG. 12, there is shown a schematic illustration of a basic configuration of the secondary 2 in accordance with the present invention. The anti-skid layer 14 adheres to the carrier 36 of the cover 12 which is placed upon the secondary member of the secondary 2 with the casting material 24. Magnetic elements 22 attract the carrier 36, which is made, e.g. of sheet metal. FIG. 13 shows a variation of the secondary 2, with the anti-skid layer 14 adhering to the casting material 24.

Figure 14:
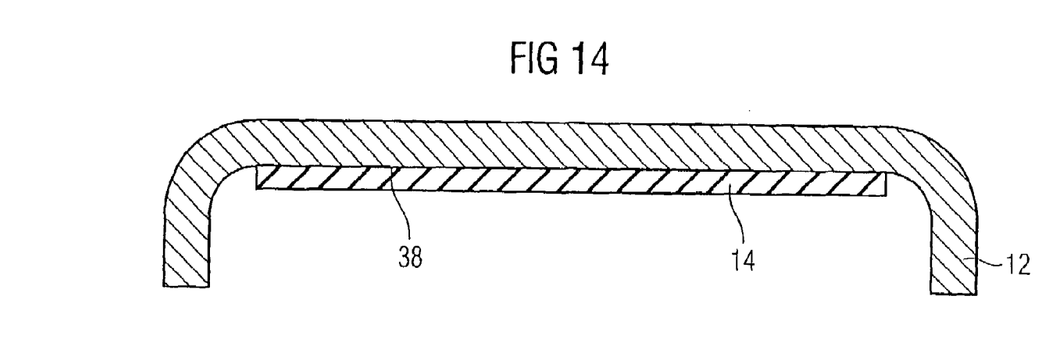
FIG. 14 is a sectional view of another variation of the cover in accordance with the present invention.
Figure 15:
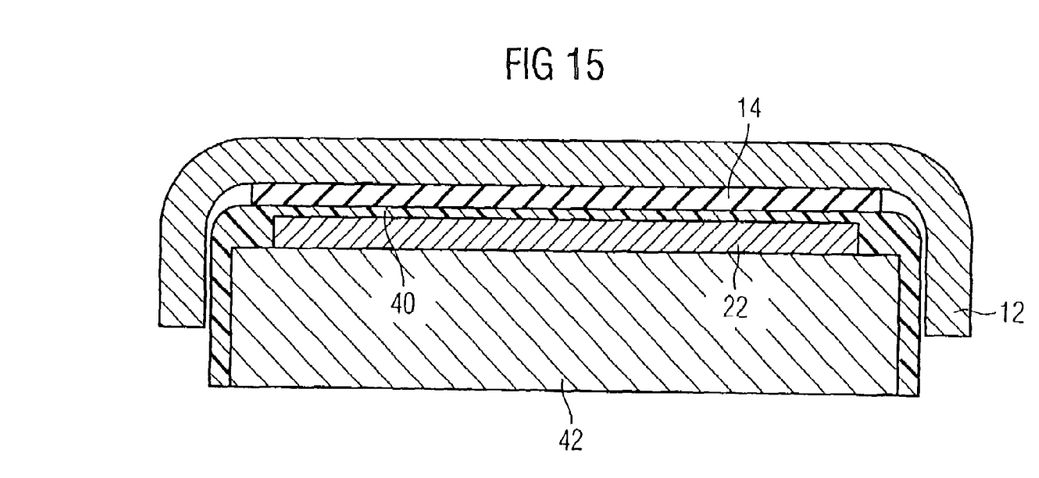
FIG. 15 is a sectional view of the cover of FIG. 14 upon a secondary.

FIG. 14 illustrates a sectional view of another variation of the cover 12 in accordance with the present invention, constructed in the form of a magnetic metal sheet which is inwardly bent at its lateral ends. Permanently attached via a glued connection to the inside of the cover 12 is the anti-skid layer 14. FIG. 15 shows the cover 12 as part of the secondary 2 having the plurality of magnetic elements 22 in the form of permanent magnets mounted onto a support plate 42. Casting material 40 of plastic is used to cast around the magnetic elements 22 and the support plate 42. Placed on the cast is the cover 12 with inside anti-skid layer 14, whereby the lateral ends of the cover 12 overlap the cast of magnetic elements 22 and support plate 42. The problem of displacement of the cover 12 in movement direction of the rotor 8 during operation of the linear motor 1 as a result of insufficient slip resistance, when chips or foreign matters, caused by friction, are caught between primary 8 and secondary 2, is hereby eliminated. The provision of the anti-skid layer 14 between cover 12 and secondary 2 results in a significant increase of the slip resistance. The anti-skid layer 14 is very thin, e.g., approximately 0.1 to 0.2 mm, and is able to permanently stick to the inner secondary-proximal side of the cover 12 to thereby form an integral part thereof. The secondary-proximal side of the cover 12 is non-adhesive but slip-resistant so that the cover 12 can be attached, removed or replaced without any tool or auxiliary means. Applying the anti-skid layer 14 to the cover 12 can be easily carried out during fabrication of the cover 12 at the manufacturer's end so that additional steps are not required by the customer, when installing the secondary 2. The properties of the material for use as the anti-skid layer 14, such as, e.g., plastic or hard rubber, can be indicated by the Shore hardness (compare DIN, EN, ISO 868). An example of a suitable material for the anti-skid layer 14 includes a commercially available sealing compound on the basis of silicone rubber with a Shore hardness of 30 to 70.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A secondary for a linear motor, comprising:
    a body comprised of at least one secondary member for defining a guideway for a rotor of the linear motor, said secondary having a permanent magnet;
    a cover including magnetizable material and adhering to the secondary member as a result of an attraction between the cover and the permanent magnet; and
    an anti-skid layer disposed between the secondary member and the cover to enhance a slip resistance between the cover and the secondary member.

2. The secondary of claim 1, wherein the anti-skid layer adheres to the cover.

3. The secondary of claim 1, wherein the anti-skid layer adheres to the secondary member.

4. The secondary of claim 1, wherein the anti-skid layer adheres to the cover and another said anti-skid layer adheres to the secondary member.

5. The secondary of claim 1, wherein the anti-skid layer has a thickness of up to 0.2 mm.

6. The secondary of claim 1, wherein the anti-skid layer is constructed as separate inset between the cover and the secondary member.

7. The secondary of claim 1, wherein the anti-skid layer contains silicone.

8. The secondary of claim 1, wherein the anti-skid layer is comprised of at least two different materials.

9. The secondary of claim 1, wherein the anti-skid layer is made of silicone and rubber.

10. The secondary of claim 1, wherein the anti-skid layer includes a surface structure.

11. The secondary of claim 10, wherein, the surface structure has a serrated configuration.

12. The secondary of claim 10, wherein the anti-skid layer has a mesh-like configuration.

13. The secondary of claim 10, wherein the anti-skid layer has a nap-like configuration.

14. The secondary of claim 10, wherein the anti-skid layer has a configuration in the form of parallel strips to define channels for drainage of liquid.

15. The secondary of claim 1, wherein the body includes at least one additional said secondary member, wherein the cover is sized to extend over the two secondary members.

16. The secondary of claim 1, wherein the body has opposite ends, and further comprising mechanical fasteners provided at the ends of the body for securing the cover to the body.

17. The secondary of claim 16, wherein the ends of the body are made of non-magnetizable material.

18. The secondary of claim 1, configured as stator for the linear motor.

19. The secondary of claim 1, wherein the cover is made in one piece of magnetizable material.

20. The secondary of claim 1, wherein the cover is made of non-magnetic material and has sections of magnetic material along the guideway to contact the body, said anti-skid layer being disposed between the sections of magnetic material and the body.

21. The secondary of claim 1, wherein the magnetizable material of the cover has a saturation induction of maximal 1.5 Tesla.

22. The secondary of claim 1, wherein the magnetizable material of the cover has a saturation induction of at least 0.3 Tesla.

23. The secondary of claim 1, wherein the cover has a thickness of less than 0.5 mm.

24. The secondary of claim 1, wherein the cover has a thickness of at least 0.1 mm.

25. The secondary of claim 1, wherein the cover is made of special steel with a saturation magnetization of ¾ 1.5 Tesla.

26. The secondary of claim 1, wherein the cover has a surface provided with a length scale extending along the guideway.

27. The secondary of claim 26, wherein the length scale is disposed in center of the guideway.

28. A linear motor, comprising a rotor as primary, and a secondary having a body comprised of at least one secondary member for defining a guideway for the rotor, said secondary having a permanent magnet, a cover including magnetizable material and adhering to the secondary member as a consequence of an attraction between the cover and the permanent magnet, and an anti-skid layer disposed between the secondary and the cover to enhance a slip resistance between the cover and the secondary member.

29. A cover for a secondary or primary of a linear motor, said cover comprising a cover body which includes magnetizable material; and an anti-skid layer applied to the cover body and increasing a slip resistance said secondary or primary having a permanent magnet, wherein the cover body adheres to the secondary or primary as a consequence of an attraction between the cover body and the permanent magnet.

30. The secondary of claim 1, wherein the cover detachably adheres to the secondary member.

* * * * *